United States Patent [19]
Lamont

[11] Patent Number: 5,732,464
[45] Date of Patent: Mar. 31, 1998

[54] METHOD OF FACILITATING INSTALLATION OR USE OF AN ELECTROMECHANICAL INFORMATION-STORAGE DEVICE DRIVE ASSEMBLY

[75] Inventor: David X. Lamont, Pleasanton, Calif.

[73] Assignee: Seagate Technology, Inc., Scotts Valley, Calif.

[21] Appl. No.: 735,262

[22] Filed: Oct. 22, 1996

Related U.S. Application Data

[60] Provisional application No. 60/024,256, Aug. 21, 1996.
[51] Int. Cl.$^6$ .................................................. H01R 43/00
[52] U.S. Cl. ............................ 29/825; 29/720; 29/721; 29/829
[58] Field of Search ..................... 29/825, 603.03, 29/829, 832, 833, 720, 721

[56] References Cited

U.S. PATENT DOCUMENTS 5,086,557  2/1992  Hyatt, Jr. ................................. 29/832

FOREIGN PATENT DOCUMENTS

| 143 845 | 9/1980 | Germany | 29/833 |
| 4-789 | 1/1992 | Japan | 29/829 |
| 5-167219 | 7/1993 | Japan | 29/829 |

*Primary Examiner*—Carl J. Arbes
*Attorney, Agent, or Firm*—Richard H. Stern; Edward P. Heller, III

[57] ABSTRACT

A shield assembly for disc drives and other electromechanical products is described in which the shield for a printed circuit board is imprinted with information concerning how to install and use the disc drive or other electromechanical product. Also described is a method for facilitating installation and use of tape drives and other electromechanical products by equipping them with a shield assembly in accordance with the invention.

12 Claims, 5 Drawing Sheets

METHOD OF FACILITATING INSTALLATION OR USE OF AN ELECTROMECHANICAL INFORMATION-STORAGE DEVICE DRIVE ASSEMBLY

This application is based on Provisional Application 60/024256, having the same title as this patent application and filed Aug. 21, 1996. The benefit of the filing date thereof is claimed herein.

BACKGROUND

This invention concerns shields for disc drives and other electromechanical products having components susceptible to electrostatic damage.

Semiconductor chips of printed circuit boards, and certain other electronic components, such as magnetoresistive heads, are susceptible to damage from electrostatic discharges, which can occur during routine handling. Disc drives, tape drives, CD (compact disc) drives, and other electromechanical products contain such printed circuit boards and other electronic components susceptible to such damage. Such printed circuit boards are also susceptible to damage from minor impacts. For example, a printed circuit board may be placed on top of a loose screw and then moved, which may result in cutting a trace and thus in failure of the unit. Because of these risks of damage, and to counter them, the products are typically shipped with warning labels and instructions for special handling. Further, handling of disc drives may lead to sweat, dirt, or body oils contaminating the printed circuit board or leading to subsequent corrosion.

Use of special anti-static straps and static-safe workstations are expedients now used to address static problems. However, they entail additional costs. Another currently used expedient is carefully handling a printed circuit board or disc drive so that it is gripped only by its sides, thereby avoiding hand contact with static-sensitive parts. However, such handling procedures may prove awkward and inconvenient.

Disc drives, tape drives, CD drives, and other electronic products often require customized installation steps to permit their interaction with a given computer or other system. For example, disc drives have different jumper setting that must be made, depending on the particular systems in which they are to be installed and their existing configurations. A given computer's CMOS needs instructions on how to configure the system for the drive. Such jumper settings and CMOS instructions must be provided to installers (who may be consumer end users) so that they can properly install drives.

This product information may be furnished in a pamphlet or other documentation accompanying the product, but there are several difficulties with so providing the information. The documentation may be lost or otherwise unavailable, especially when a customer needs to reinstall a product or reconfigure a system at some later time. It is often difficult for a consumer end user to interpret a diagram in documentation and to apply its teachings to a separate, three-dimensional object, for example, to identify necessary jumper settings and their locations. Many consumer end users cannot readily distinguish jumpers, power cable connectors, and interface cable connectors, and have difficulty in properly orienting them.

The foregoing characteristics of disc drives, tape drives, CD drives, printed circuit boards, and other electronic products have for many years created reliability problems, difficulties in product handling, and consumer dissatisfaction.

Another characteristic of disc drives and similar products that may create reliability problems and cause customer dissatisfaction, which has recently become of increased importance, is their capacity to create electromagnetic interference (EMI). The FCC regulates EMI emission because it adversely affects other signals, such as those for radios and TV. Now that TV chips are being installed in personal computers, keeping EMI to a minimum has become increasingly important.

OBJECTS AND SUMMARY OF THE INVENTION

It is an object of this invention to improve the reliability of disc drives, tape drives, CD drives, printed circuit boards, and other electronic products by decreasing risks of electrostatic damage, minor impact damage, contamination, and corrosion. It is a further object of the invention to provide an improved method of identifying jumper settings to consumer end users in a manner that they can more readily understand and accurately implement. It is a further object of the invention to provide an improved method of making other installation and configuration information available to installers and consumer end users both at the time of original installation of the products and subsequent reconfiguration of the systems. It is a further object of the invention to decrease EMI from drives, including EMI affecting other components of computer systems within which drives are installed.

The present invention provides an improved shield assembly in which the shield simultaneously (a) functions as a shield for an electronic product and (b) provides a substrate that is conveniently located and is not easily mislaid, on which essential information is provided relating to the use and installation of the shielded electronic product. The information is provided preferably in a manner that points out to users how to make settings and connections without need for the users to interpret diagrams placed in separate, accompanying product documentation.

Two principal commercial embodiments are contemplated at this time. In one, the shield is in the form of an adhesive label placed over the exteriorly disposed back of a printed circuit board for a hard disc drive, where the interiorly disposed other side of the printed circuit board has all of the semiconductor chips and other static-sensitive components on it. Since the back of the printed circuit board is an exterior portion of the disc drive assembly, the label is accessible and visible to users for purposes of installation and reconfiguration.

In a second embodiment, also for a printed circuit board for a hard disc drive, the shield is metallic and thus both covers the static-sensitive components of the printed circuit board and prevents electromagnetic radiation from escaping. The outside of the metallic shield is an exterior portion of the disc drive assembly, and that portion of the shield is finished so as to adapt it to receiving printed information, which is imprinted directly on the shield or imprinted on a label fastened to it, so that it is accessible and visible to users of the disc drive.

DETAILED DESCRIPTION OF THE INVENTION

A central feature of the invention is the co-action and cooperation between the shield and the kind of information placed on it. The shield thus acts both as a shield and as a substrate for information concerning the shielded product, such as installation and system configuration information. These two functions are combined to provide added product reliability and user convenience, which would not be available absent the combination provided by the invention. As described in more detail hereinafter, the combination provided in the invention and resulting functional interaction between the shield/substrate and the information imprinted thereon makes it possible to overcome problems, difficulties, and inconvenience previously encountered in handling, installing, and using disc drive assemblies and other static-sensitive electronic products.

It should be understood that the inventor does not assert novelty and nonobviousness of the specific printed matter on the substrate, nor novelty and unobviousness of the particular anti-static shielding technology used here. The inventor regards his invention to be the combination of this kind of printed matter and this kind of substrate (an anti-static shield) for use in facilitating installation and use of disc drive assemblies and similar products which both need anti-static shielding and need the provision of instructive information material in a manner such that installers (who may be consumer end users) can easily and conveniently install and use the products. In short, the invention is the provision of a novel and nonobvious functional relationship between the substrate (which is also a shield for a printed circuit board for a disc drive or similar product) and the information imprinted on it, in order to accomplish a useful result in the technological field of installation and use of disc drives and similar products.

The inventive relationship here is not simply the provision in any location of any substrate for supporting any information. Rather, the invention requires a substrate that is a shield having an exterior, viewable surface adapted for registration of imprinted information, where the imprinted information concerns the manner of installation and use of the disc drive whose printed circuit board is protected by the shield. Other kinds of information will not do; differently located substrates (such as the interior and thus non-visible surface of the shield) will not do; and substrates not adapted for registration of imprinted information will not do.

Label/Shield Embodiment

Figure 1:
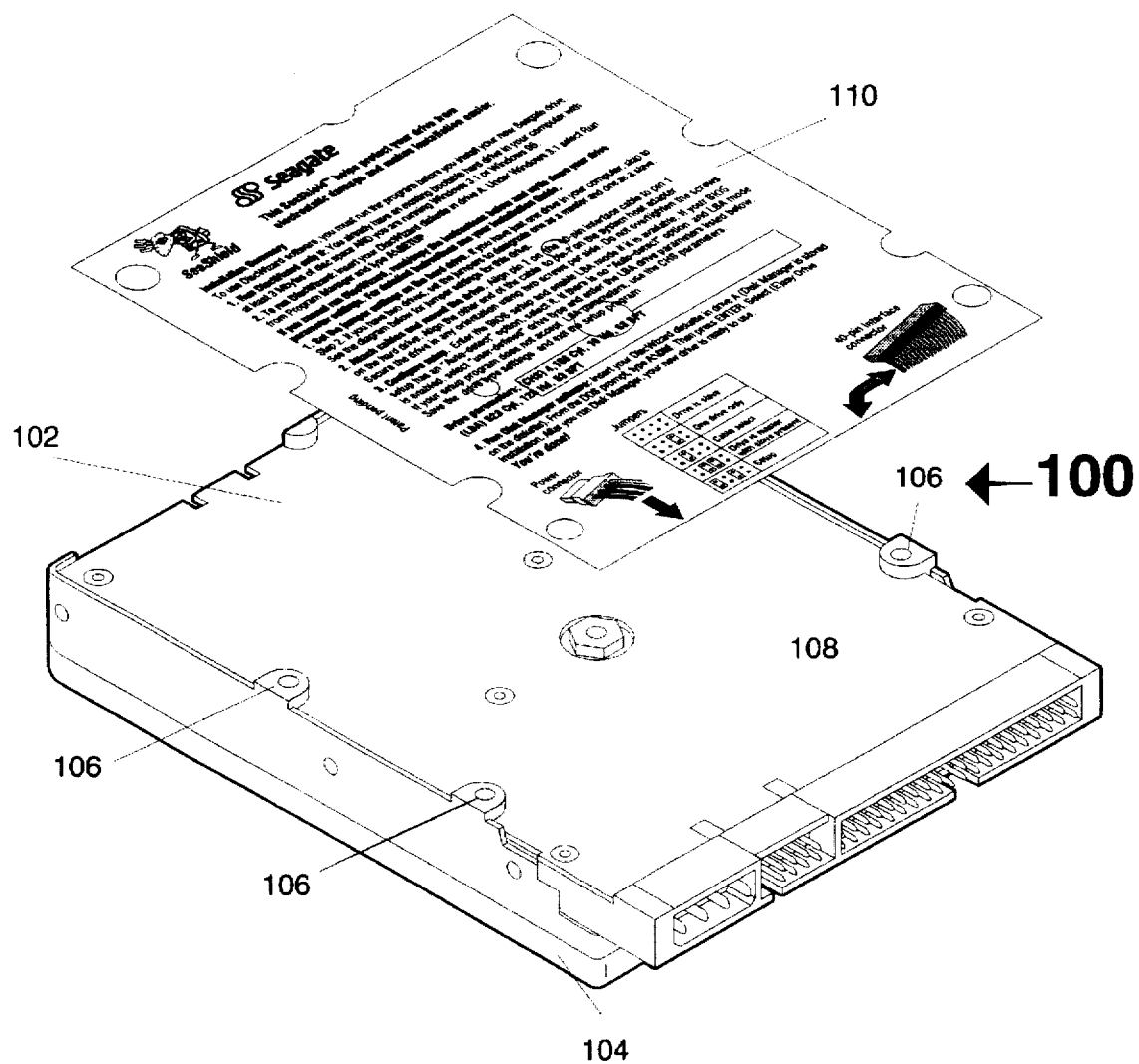
FIG. 1 is an exploded perspective view of a disc drive assembly embodying a shield that is an adhesive label.

One contemplated commercial embodiment of the invention, shown in partially exploded perspective in FIG. 1, is intended for use with a hard disc drive assembly 100, such as a Seagate Technology, Inc. No. ST52520A 2.5 GB hard disc drive. Disc drive assembly 100 has a printed circuit board 102 that is bolted to a head-disc assembly 104. (A head-disc assembly includes, among other things, at least one read-write head, a magnetically encodable hard disk, a motor to rotate the disk, and head radial-transport means.) Head-disc assembly 104 is provided with four upwardly projecting posts 106 having threaded apertures via which printed circuit board 102 is bolted to head-disc assembly 104. (Other conventional ways to fasten the printed circuit board and head-disc assembly can be used.)

Printed circuit board 102 has an exteriorly disposed surface 108 (i.e., the surface facing away from head-disc assembly 104), which does not have any semiconductor chips or other static-sensitive components on it and is therefore relatively flat. Such components (not shown) are all located on the interiorly disposed surface (not shown) of printed circuit board 102.

For this product, shielding is adequately provided simply by having an insulated adhesive sheet 110 placed over exteriorly disposed surface 108 of printed circuit board 102. (Sheet 110 need not be adhesively coated, however, and may instead be fastened to surface 108 by being screwed down, for example, to printed circuit board 102.)

Although the foregoing embodiment does not provide shielding against EMI, that can be provided by replacing insulated adhesive sheet 110, as described above, by a laminated unit, such as a sheet of foil sandwiched between two insulated sheets, where the foil has a connector permitting it to be grounded to the head-disc assembly or another appropriate ground.

Figure 2:
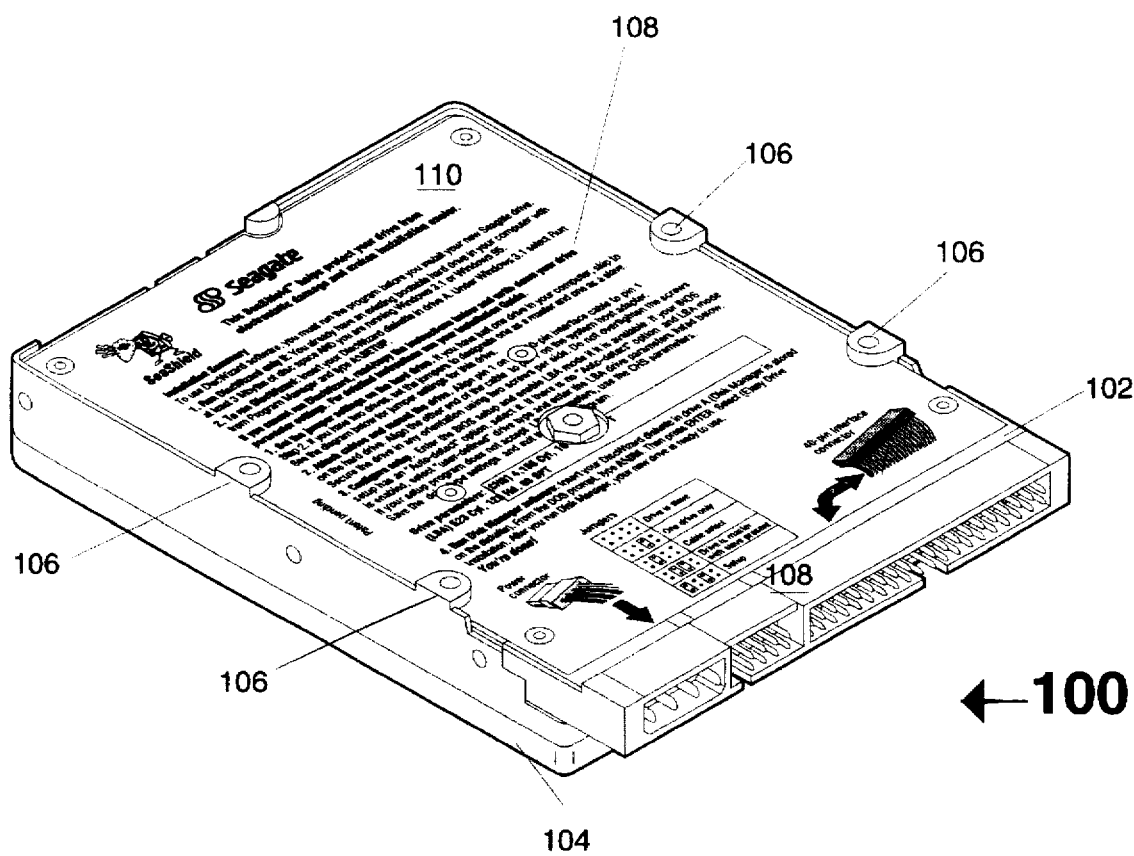
FIG. 2 is a perspective view of the disc drive assembly of FIG. 1 assembled with the shield in place.

FIG. 2 shows hard disc drive assembly 100 assembled, with sheet 110 and the information imprinted on it available for inspection by users and shielding printed circuit board 102. The configuration of hard disc drive assembly 100 described above and illustrated in FIGS. 1–2 is intended to be illustrative of an embodiment of the invention (using Seagate No. ST32132A as an example) and other models will have different configurations.

Sheet 110 in this embodiment may advantageously be a white Mylar or polyester sheet with an anti-static surface. Sheet 110 is approximately 2 mil thick and, depending on the particular drive, approximately 4.5×6.75 inches. The bottom face of sheet 110, which is to be placed against surface 108 of printed circuit board 102 is, if the sheet is to be fastened adhesively, advantageously coated with a UL-approved contact cement to make it adhere to surface 216. One example of a suitable material for sheet 110 is a product of Flexcon Co. Inc., Spencer, Mass. 01562, that is marketed under the designation THERMLfilm® SELECT™ 21940. This product is a 2-mil, gloss-topcoated, thermal transfer printable, white polyester film coated with a solvent-based acrylic adhesive on the back. The material has static dissipating properties and its UL listing indicates temperature rating from −40° C. to 150° C. when affixed to aluminum, galvanized steel, or stainless steel, and −40° C. to 80° C. when affixed to various plastic materials.

Metallic Shield Embodiment

Figure 3:
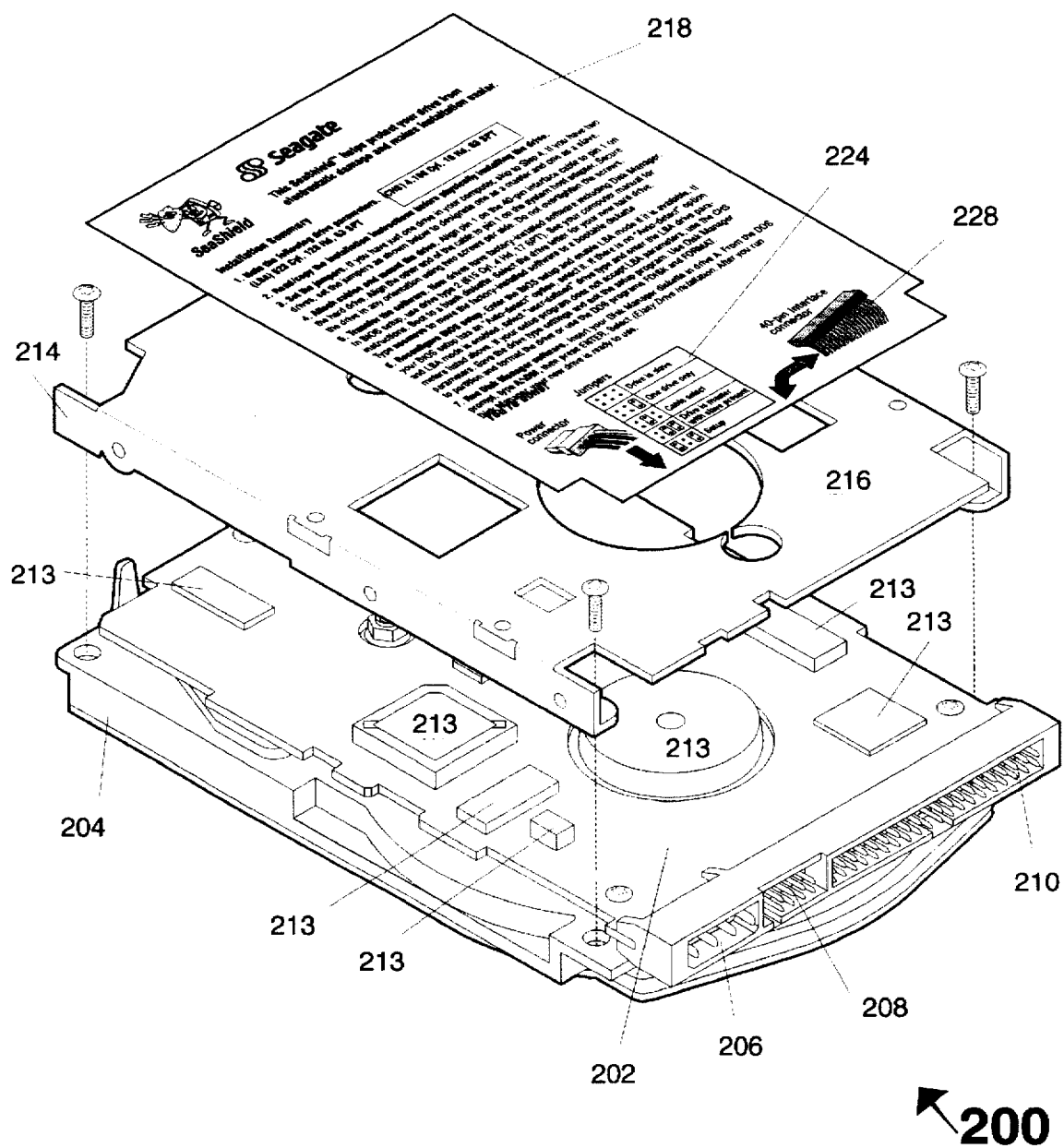
FIG. 3 is an exploded perspective view of a disc drive assembly embodying a shaped metallic shield to which an adhesive label is attached.

A second contemplated commercial embodiment of the invention, shown in partially exploded perspective in FIG. 3, is intended for use with a hard disc drive assembly 200, such as a Seagate Technology, Inc. No. ST32132A 2.1 GB hard disc drive. Disc drive assembly 200 includes a printed circuit board 202 fastened to a head-disc assembly 204.

Figure 5:
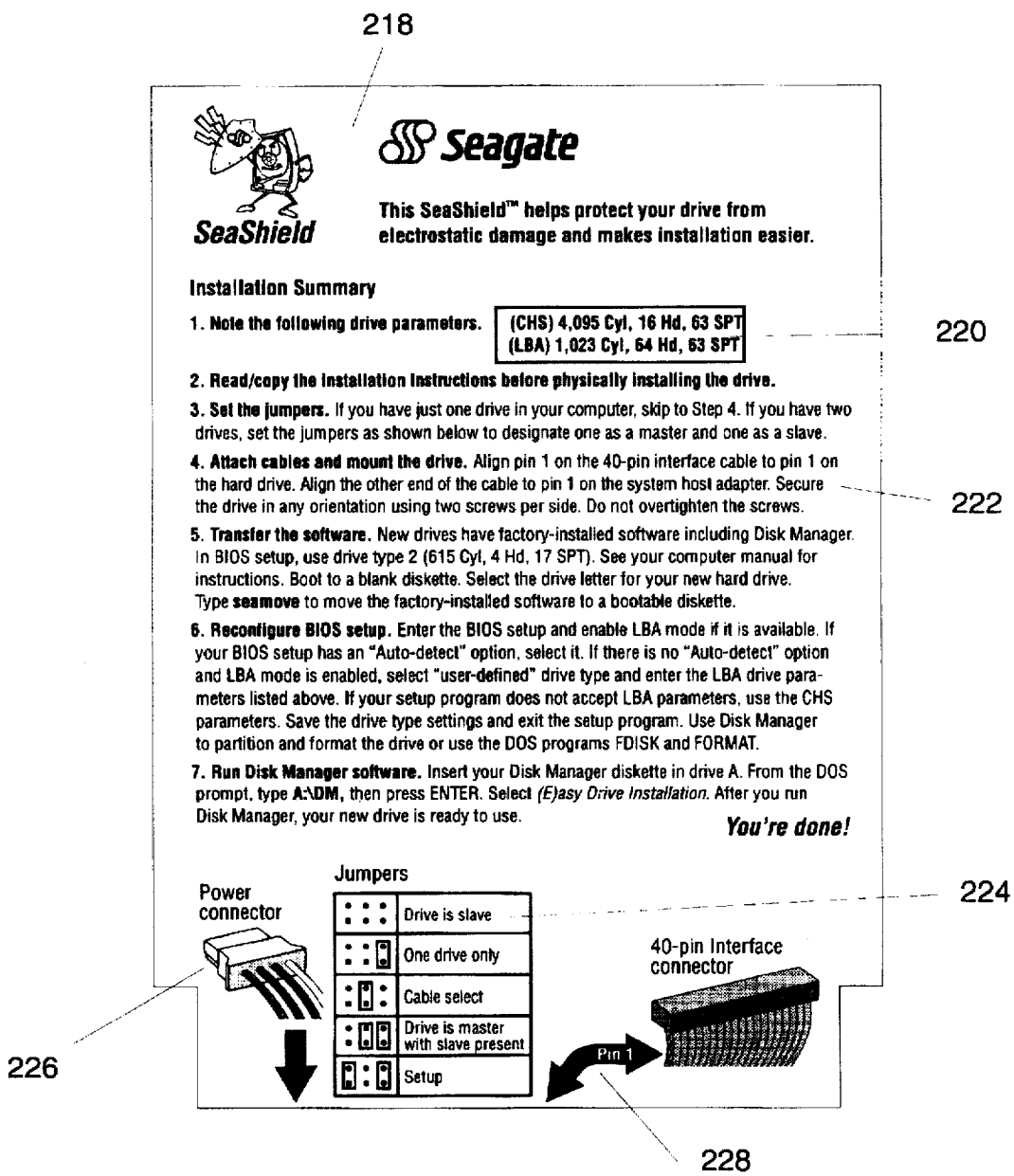
FIG. 5 is a plan view of the label for the disc drive assembly of FIGS. 3 and 4.

Printed circuit board 202 includes at one end a power connector receptacle 206, jumpers 208, and an interface cable connector receptacle 210. These relation of these components of printed circuit board 202 to the invention are described below, in connection with FIG. 5, illustrating the label for disc drive assembly 200.

Printed circuit board 202 has an exteriorly disposed surface 212 (i.e., the surface facing away from head-disc assembly 204) that has conductive traces as well as semiconductor chips and other impact-sensitive and static-sensitive components 213 on it.

Furthermore, for this model it was desired to provide a metallic shield to reduce emission of electromagnetic radiation from the printed circuit board. Accordingly, a shield 214 for this unit was specified as a shaped and machined metallic plate (referred to as a "SeaShield"™ plate) bent and machined to fit around the printed circuit board and components of it, so that the shield will reduce EMI from being transmitted from the printed circuit board and so that the shield and printed circuit board can be engaged or fastened together. Shield 214 is provided with drilled, stamped, or cut apertures as required to accommodate components protruding from the printed circuit board. If cost considerations indicate that such a design choice is appropriate, shield 214 can be molded and sintered from metal powder, or shield 214 can be molded plastic which is metallically coated or otherwise made conductive.

Shield 214 is bolted (screwed) to head-disc assembly 204 by four bolts fitting into threaded apertures in head-disc assembly 204. (Other conventional ways to fasten the printed circuit board, shield, and head-disc assembly can also be used.)

Figure 4:
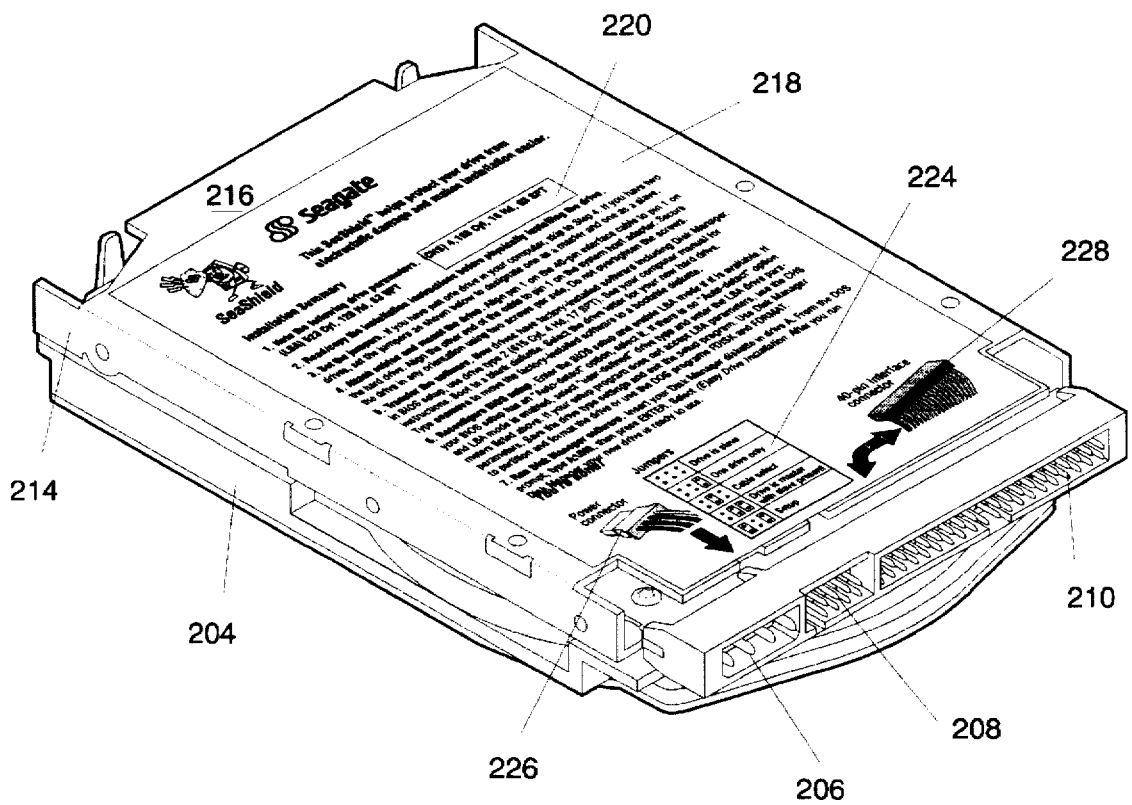
FIG. 4 is a perspective view of the disc drive assembly of FIG. 3 assembled with the shield in place.

Shield 214 is configured so that when shield 214 is fastened to head-disc assembly 204, an upper surface 216 of shield 214 and the upper surfaces of the components of printed circuit board 202 together provide a relatively flat surface for receiving a label 218. Disc drive assembly 200, as assembled, is shown in FIG. 4. As thus assembled, shield 214 provides printed circuit board 202 with protection against electrostatic discharge and impact damage, and at the same time shield 214 reduces emission of EMI from printed circuit board 202.

In this application, the exteriorly disposed upper surface 216 of shield 214 and the upper surfaces of components of printed circuit board 202 receive an adhesive sheet 218 imprinted with instructions for installation and configuration of assembly 200. In this application, sheet 218 can, but need not, be the same label material as was described for sheet 110. Because sheet 218 is affixed to a metal shield, it need not be 2-mil insulated polyester; instead, it can be a thinner label of appropriate label material, such as vinyl, as design choice may dictate.

However, in some applications, depending on the configuration of the components protruding from the printed circuit board, it is possible to imprint such instructions directly on exterior surface 216 of the shield. For purposes of the latter embodiment, it is necessary to insure correct registration between the printing and the substrate, and to prepare surface 216 to receive and retain the printed matter (for example, by removing any oil film and otherwise deglazing the surface). Where shielding electromagnetic radiation is not a factor, shield 214 can be a molded plastic article. Further, sheet 218 need not be adhesive, but can be fastened to shield 214 by other appropriate means, such as screwing it down.

Label

Sheet 218 of FIGS. 3–4 is shown in greater detail in plan view in FIG. 5. This figure also shows the informational copy instructing users about installation and configuration of the ST32132A drive, which is imprinted on sheet 218. FIG. 5 also illustrates the functional relationship between the substrate (which is also a shield for the printed circuit board) and the information imprinted on it, in order to accomplish objects of the invention. (While the following description is directed to sheet 218 and disc drive assembly 200 for the proposed ST32132A drive, a person of ordinary skill will appreciate that like considerations apply to sheet 110 and its disc drive assembly 100 or to another drive.)

FIG. 5 shows printed matter copy presently intended for a representative commercial embodiment of the invention (a "SeaShield" label for a proposed Seagate Technology, Inc. No. ST32132A 2.1 GB hard disc drive). Portion 220 of sheet 218 is a drive parameter table for the disc drive. Portion 222 of sheet 218 contains installation instructions. Because the information imprinted in portions 220 and 222 of sheet 218 is, effectively, integrally formed with the disc drive assembly, it cannot become lost and is always readily available to users.

Portion 224 of sheet 218 is a table of jumper settings. Referring to FIGS. 3–4, it is seen that jumpers 206 of printed circuit board 202 are located immediately adjacent to portion 224 of sheet 218, once sheet 218 is put into place in disc drive assembly 200 as shown in FIG. 4. Accordingly, an installer or user making jumper settings can readily find the appropriate jumpers for a given setting and can compare visually the resulting settings with the instructions for making them, thus decreasing opportunity for error.

Portion 226 of sheet 218 shows a picture of a power cable and connector for disc drive assembly 200 and contains an arrow pointing to an edge of sheet 218. Referring to FIGS. 3–4, it is seen that power connector receptacle 204 of printed circuit board 202 is located immediately adjacent to portion 224 of sheet 218, once sheet 218 is put in place in disc drive assembly 200 as shown in FIG. 4, so that the arrow imprinted on portion 226 points directly to the place where the installer or user should connect the power cable.

Portion 228 of sheet 218 shows a picture of a 40-pin interface cable connector and interface cable (ribbon cable) for disc drive assembly 200, and contains an arrow pointing to an edge of sheet 218. Referring to FIGS. 3–4, it is seen that 40-pin interface cable connector receptacle 208 of printed circuit board 202 is located immediately adjacent to portion 228 of sheet 218, once sheet 218 is put in place in disc drive assembly 200 as shown in FIG. 4. Therefore, the arrow imprinted on portion 228 points directly to the place where the user should connect the 40-pin interface cable.

In addition, the illustration of the ribbon cable shows its proper orientation, so that a user comparing the cable illustration of portion 228 with the user's own actions can confirm whether the user is correctly placing the cable connector in its proper place in receptacle 208 or is misconnecting it (i.e., inserting it upside down). The result is to decrease the widespread confusion or bewilderment of end users regarding correct orientation of multi-pin cable connectors relative to their sockets or receptacles, which may otherwise occur with connectors such as a 40-pin interface cable connector.

While the foregoing description contemplates an application in which the printed circuit board of the drive is connected to the motherboard of the computer by means of a cable, a subsequent application may use direct connector-to-connector coupling of the drive and motherboard. In such an application, the information and illustrative material concerning connectors or receptacles would be appropriately modified to reflect such direct coupling.

The foregoing description illustrates some of the functional interaction here between the substrate and the information imprinted on it. The juxtaposition of instructions and arrows physically pointing out where components are to be connected facilitates recognition and understanding of the connection step that the installer or other user must perform. Because the instruction for connecting a cable is located proximate to where the cable must be connected, and with an arrow pointer as well, a user can more readily and accurately understand what step the user must perform and how to go about it. The user is not obliged to refer to a diagram in documentation accompanying the product, nor to interpret such a diagram and work out how to apply its teachings to the actual physical objects confronting the user. The expedients of the invention thus decrease users' possible confusion or bewilderment, error, and dissatisfaction.

Concluding Remarks

As used hereinafter, imprinting instructions on a surface of a shield means imprinting them directly on the surface of the shield or else imprinting them on an adhesive label placed over (and adhering to) the surface of the shield. (Where the label itself acts as the shield, the foregoing alternatives coincide.)

As used hereinafter, that the exterior surface of the shield has a medium for registering printed matter integrally formed therewith means:

(a) where the shield is an adhesive sheet or label (as in the label/shield embodiment described above in which an adhesive sheet is placed on a flat exterior surface of a printed circuit board), that the external surface of the sheet or label acting as a shield is adapted to be printed upon (and, ordinarily, was imprinted before it was placed on the printed circuit board);

(b) where the shield is a shaped, machined, or molded part (as in the metallic shield embodiment described above):

(1) at least part of the exterior surface of the shield is adapted to receive information imprinted directly thereon; or (2) a separate sheet or label is affixed to the exterior surface of the shield in a substantially permanent manner (thereby adhering to and becoming integrally formed with the shield), and information is imprinted on the sheet or label (ordinarily, before it is placed onto the shield).

In this application, the medium for registering printed matter and the exterior surface of the shield usually comprise a unitary article or else they are fused or intimately joined together so as to function thenceforth as a unitary article. Generally, it is considered by the inventor that it is undesirable to allow the medium for registering printed matter and the exterior surface of the shield to be removably coupled, because that might lead to the information on the label not being available to the user on a subsequent occasion (after initial installation) when it is needed. However, if the shield is not an adhesive sheet fastened over the printed circuit board, it would be possible to have the shield removably coupled to the disc-head assembly and it would be possible also to have the medium for registering printed matter removably coupled to the shield (for example, removably placed within a transparent plastic envelope fastened to the shield). While the inventor does not consider this a preferred mode of carrying out the invention, nonetheless it is a possible expedient and is therefore believed to fall within the spirit of the invention, even if it is a non-preferred embodiment of the invention. Accordingly, imprinting instructions on an exteriorly disposed surface of a shield is considered to include such equivalent means of presentation of the instructions to a user as associating them with the shield by removably coupling them to the shield in a manner that makes them readily visible to the user, for example, by placing them within a transparent plastic envelope fastened to the shield, whereby the instructions are indirectly imprinted on the shield.

As used hereinafter, a drive assembly is a combination of a drive and a printed circuit board that is operatively coupled to the drive. Ordinarily, the printed circuit board is electrically connected to, and is used to control, the operation of the drive, such as by moving a read/write head to an appropriate data track and keeping the head centered on the track.

As used hereinafter, a coupler for engaging a shield with a printed circuit board refers to an mechanism, device, or other expedient for placing a shield into a spatial relationship with a printed circuit board so that the former shields the latter. Typically, this is accomplished by bolting the shield to threaded holes in posts on the disc drive assembly's chassis (to which chassis the printed circuit board is also bolted), or to threaded holes in similar posts on the printed circuit board, which may pass through the printed circuit board and terminate in the disc drive assembly's chassis. However, the desired spatial relationship can be established by other fastening expedients, such as welding or epoxying, and in the case of a shield that is an adhesive label it is established by placing the adhesive face of the label onto the printed circuit board. What form of connection, fastening, or other coupling expedient is utilized is not essential; the shield simply must be located in relation to the printed circuit board so that the shield shields the printed circuit board.

As used herein, a connector may be a connector attached to a cable; a connector may also be a connector used in direct connector-to-connector coupling between a printed circuit board of a drive and a motherboard. Ordinarily, a drive has a connector receptacle mounted at a site on an end of the drive's printed circuit board (see element 210 of FIGS. 3–4, a standard 40-pin receptacle), and the receptacle is intended to be connected to a female connector that is connected to a cable, but the connector may instead be mounted at a site on a motherboard. A connector site for a printed circuit board is a site at which such a receptacle for either such a connector is located.

While the invention has been described in connection with specific and preferred embodiments thereof, it is capable of further modifications without departing from the spirit and scope of the invention. For example, the specification described two intended commercial embodiments involving printed circuit boards for hard disc drives. The same principles of the invention apply to tape drives, floppy diskette drives, optical devices such as CD drives, and other electromechanical devices that are static-sensitive and/or that require end users to make connections to them or adjust jumpers or settings on them. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, but rather comprehends the subject matter defined by the following claims.

The subject matter claimed is:

1. A method for facilitating installation or use of an electromechanical information storage device drive assembly, said drive assembly comprising a drive and a printed circuit board operatively coupled to said drive, said method comprising:

(1) providing an electrostatic shield for said printed circuit board, where at least a portion of said electrostatic shield is an exteriorly disposed, generally planar surface;

(2) providing instructions for installation, configuration, or use of said drive assembly;

(3) imprinting said instructions on said exteriorly disposed, generally planar surface of said electrostatic shield;

(4) engaging said electrostatic shield with said printed circuit board in a manner such that said electrostatic shield electrostatically shields said printed circuit board and said instructions are made viewable by installers, configurers, or users of said drive assembly; and (5) providing the drive assembly to an installer, configurer, or user thereof for installation, configuration, and/or use thereof.

2. A method according to claim 1, wherein said electrostatic shield is a shaped, machined, or molded article and has an exteriorly disposed, generally planar surface.

3. A method according to claim 2, wherein said step (3) further comprises imprinting said instructions on a label and affixing said label to said exteriorly disposed, generally planar surface.

4. A method according to claim 2, wherein said step (3) further comprises imprinting said instructions directly or indirectly on said exteriorly disposed, generally planar surface.

5. A method according to claim 1 wherein:

said electrostatic shield is a label; and said step (3) further comprises imprinting said instructions on said label and affixing said label to an exteriorly disposed surface of said printed circuit board.

6. A method according to claim 1 wherein:

said electrostatic shield comprises a grounded conductive member; and step (4) further comprises engaging said electrostatic shield with said printed circuit board in a manner such that said grounded conductive member shields said printed circuit board from emitting EMI.

7. A method according to claim 1, wherein step (4) further comprises locating a predetermined portion of said electrostatic shield proximate to a connector site for said printed circuit board, and step (3) further comprises imprinting on said predetermined portion of said electrostatic shield an instruction to attach a connector at said connector site.

8. A method according to claim 1, wherein step (4) further comprises locating a predetermined portion of said electrostatic shield proximate to at least one location of a jumper on said printed circuit board, and step (3) further comprises imprinting on said predetermined portion of said electrostatic shield at least one instruction for setting a jumper.

9. A method according to claim 1, wherein said electromechanical information storage device drive assembly is a hard disc drive assembly, said information storage device is a hard disc, and said drive is a hard disc drive.

10. A method according to claim 1, wherein said electromechanical information storage device drive assembly is a tape drive assembly, said information storage device is a tape, and said drive is a tape drive.

11. A method according to claim 1, wherein said electromechanical information storage device drive assembly is an optical drive assembly, said information storage device is an optical disc, and said drive is an optical drive.

12. A method according to claim 1, wherein said electromechanical information storage device drive assembly is a floppy diskette drive assembly, said information storage device is a floppy diskette, and said drive is a floppy diskette drive.

* * * * *